A. B. HAMAKER.
Grinding Mill Regulator.
No. 39,648.
Patented Aug. 25, 1863.
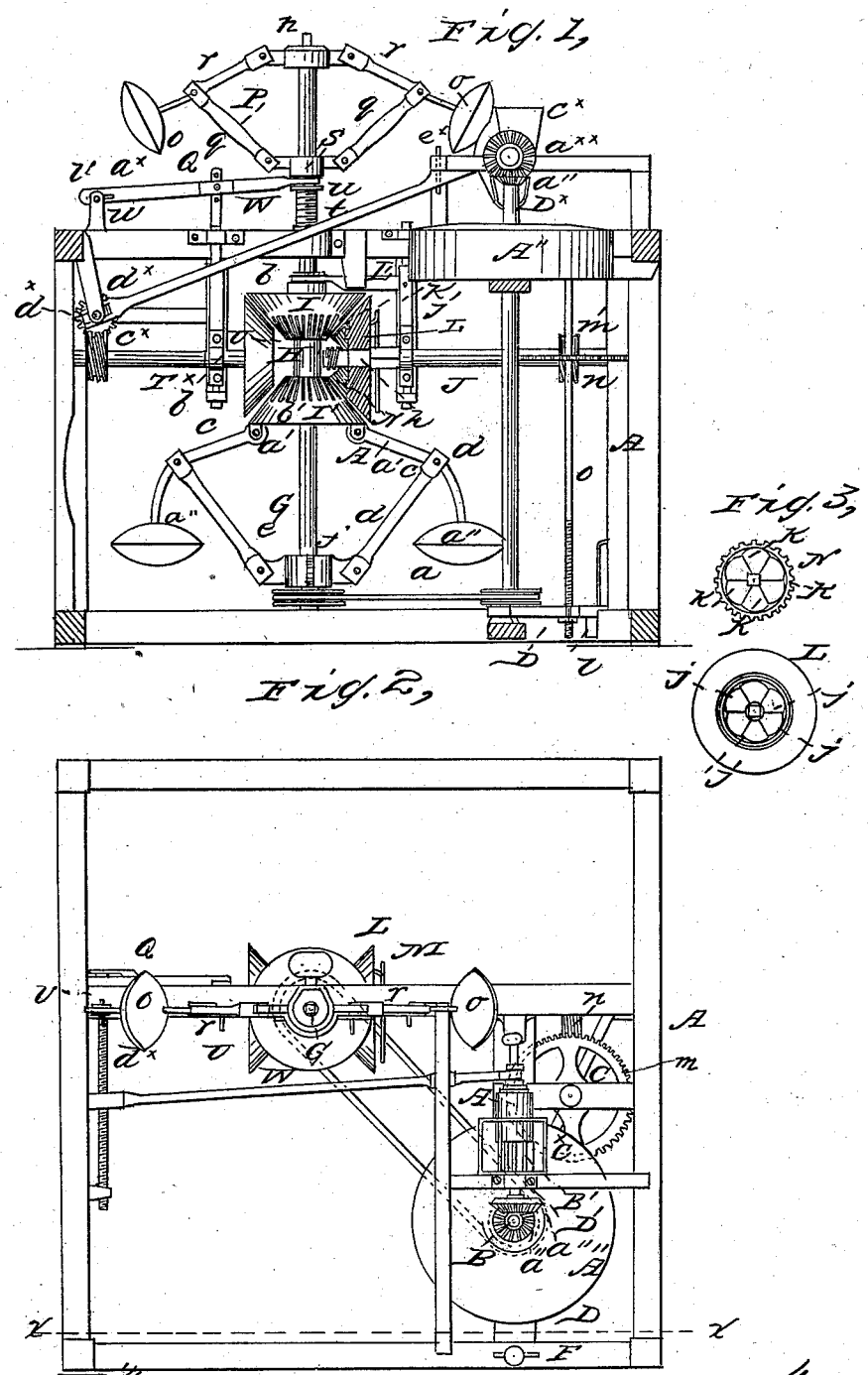

UNITED STATES PATENT OFFICE.

A. B. HAMAKER, OF SALUNGA, PENNSYLVANIA.

IMPROVEMENT IN REGULATORS FOR GRINDING-MILLS.

Specification forming part of Letters Patent No. 39,648, dated August 25, 1863; antedated August 14, 1863.

*To all whom it may concern:*

Be it known that I, A. B. HAMAKER, of Salunga, in the county of Lancaster and State of Pennsylvania, have invented a new and Improved Automatic Regulating Device for Grinding-Mills; and I do hereby declare that the following is a full, clear, and exact description of the same, reference being had to the accompanying drawings, making a part of this specification, in which—

Figure 1 is a side view of my invention, the framing being in section, as indicated by the line $x\,x$, Fig. 2. Fig. 2 is a plan or top view of the same; Fig. 3, detached views of a friction-wheel and a gear-wheel pertaining to my invention.

Similar letters of reference indicate corresponding parts in the several figures.

This invention relates to a new and improved automatic device for grinding-mills, the same consisting of a combination of parts for regulating the speed of the stones, the feed or supply of grain to the same, the adjusting of the stones so as to regulate the space between them in order that the grain may be ground of the required degree of fineness, and also for regulating the power by which the stones are driven.

To enable those skilled in the art to fully understand and construct my invention, I will proceed to describe it.

A represents a framing, which may be constructed in any proper manner to support the working parts.

B is the spindle of a millstone, the end of which rests on a supplemental bridge-tree, C, and the latter rests at one end on a bridge-tree, D, which is adjusted as usual by a screw-rod, E, and nut F.

G is a shaft which is placed vertically in the framing A, and is driven from the spindle B by a belt, $a$. This shaft G has a sleeve, H placed loosely upon it, on each end of which there is a bevel-wheel, I, representing the upper, and I′ the lower one. The faces of these bevel-wheels are composed each of a toothed and a smooth portion, $b\,b'$, as shown clearly in Fig. 1.

To the lower wheel, I′, there are attached by pivots $a'$ two arms, $c\,c$, of a governor, A′. These arms work on fulcrum-pins $d\,d$, in arms $d'\,d'$, the lower ends of which are pivoted to a slide, $e$, on the shaft G. The slide $e$ is fitted loosely on the shaft G, and may be secured at any desired point by a set-screw, $f$.

J is a shaft which is fitted horizontally in the framing A, and has its inner bearing, $g$, attached to a vertical slide, K, which is connected by a lever, L′, to the upper part of the sleeve H, and the outer end of the lever L′ passes through a mortise in the slide K. On the inner end of the shaft J there is placed loosely a bevel-wheel, L, which has a smooth periphery and is connected to the shaft J by a spiral spring, M. On the shaft J, beyond or at the outer side of the bevel-wheel L, there is placed a bevel-pinion, N. This pinion is fitted on a square, $h$, on the shaft J, and is allowed to slide on said square. A spiral spring, $i$, which is attached to the inner end of shaft J, bears against the pinion N, and has a tendency to keep said pinion in contact with the wheel L, as will be fully understood by referring to Fig. 1. The front surface of the bevel-wheel L has a series of double inclined surfaces, $j$, formed on it, and similar surfaces, $k$, are formed on the back part of the pinion N, as shown in Fig. 3. The object of these inclined surfaces will be presently explained. The weights $a''$ of the governor A′ are not spherical, but of ellipsoidal form. This governor regulates the distance or space between the stones, so as to cause the grain to be ground of uniform fineness throughout. This is effected by the operation of the supplemental bridge-tree C, which is actuated through the medium of a screw-rod, O, nut $l$, worm-wheel $m$, and screw $n$, the latter being on the shaft J, and the worm-wheel $m$ being on the screw-rod O. The shaft J is rotated by the wheels I I′, bevel-wheel L, and pinion N, and either the wheel I or I′ is made to act upon the wheel L, according as the sleeve H is actuated or moved by the governor, the wheel I causing the shaft J to be rotated in one direction and the wheel I′ in the other direction. The wheel L is not stationary, but is made to rise and fall to meet either wheel I or I′, in consequence of the connection of the shaft J to the sleeve H by means of the slide K and lever L′. This movement of the shaft J and wheel L renders the governor more sensitive in its action. By this arrangement it will be seen that the space between the stones may always be kept at a uniform width, so that the grain will be ground of a uniform degree of fineness. If the spindle contracts the faces of the stones will approach each other and diminish speed, which at once tells upon the governor, and the latter will bring the lower wheel, I', of the sleeve in contact with the wheel L of shaft J and cause said shaft to be rotated, and the supplemental bridge-tree C will be actuated so as to raise the runner or rotating stone A''. On the contrary, if the spindle expands so as to unduly increase the width of the space between the stones, the motion of the runner will be increased, and this motion is at once reduced and the space between the stones brought to the required width by the governor bringing the upper wheel, 1, in contact with the wheel L and reversing the movement of the screw-rod O. The action of the governor is regulated or modified by adjusting the slide $e$ higher or lower on the shaft G. When the slide $e$ is adjusted high on the shaft G, the latter requires a quicker rotation or more speed to actuate the sleeve H than when it is adjusted lower down, and by adjusting this slide $e$ the action of the governor may be regulated as desired. The friction-wheel L may not be reliable when heavy stones are to be adjusted, and consequently I deem it preferable to use the gearing. In this case, the friction-wheel L is only employed for throwing the pinion N in gear with either of the wheels I or I', and this is effected by the inclined surfaces $j$ $k$ on the wheel L and pinion N. When the wheel L is free from either the wheel I or I', the spring M will throw the wheel L back to its required position, and the spring $i$ will throw the pinion N out of gear with either of the wheels I I'. For light work or when a small and light stone is to be raised and lowered a friction-wheel L, attached permanently to the shaft J, would answer the purpose.

P is a governor, which is also on the shaft G, and is constructed precisely like the governor A'. The weights of governor P are designated by $o$ $o$, the slide by $p$, the fulcrum-arms by $q$ $q$, and the weight-arms by $r$ $r$. The fulcrum-arms $q$ $q$ are attached to a slide, $s$, on the shaft G, and said slide rests on a spring, $t$, and has a groove, $u$, made circumferentially in it to receive the forked end of a lever, Q, the fulcrum-pin $v$ of the latter being in an upright, $w$, on the framing A, said fulcrum-pin passing through an oblong slot, $a^x$, in lever Q, as shown in Fig. 1. To the lever Q a vertical slide, S, is attached, having at its lower part a bearing, $b^x$, in which a shaft, T, is fitted. This shaft has a friction-wheel, U, on its inner end, which is fitted between the wheels I I' of the sleeve H, and on the outer part of the shaft T there is placed a screw, $c^x$, which gears into a worm-wheel, V, on a horizontal screw-shaft, $d^x$, the latter having a nut, $d^{xx}$, upon it, which is attached to a lever, W, the fulcrum-pin of which is shown at $\iota^x$, and may be fitted in one of a number of holes as required. This lever W is attached to the feed mechanism, which consists of a tube, $A^x$, fitted over or upon a longitudinally-fluted cylinder, $B^x$, which is placed in the lower part of the hopper $C^x$, and just above or in the upper part of the shoe $D^x$. The interior of the tube $A^x$ is made to fit precisely the exterior of the cylinder $B^x$, and the latter serves to feed the grain from the hopper $C^x$ into the eye of the stone A'', and it will be seen that the discharge of the grain from the hopper may be regulated as desired by sliding the tube $A^x$ on the cylinder $B^x$ so as to expose a greater or less surface of the latter. This sliding of the tube $A^x$ is effected by the operation of the lever W, which is actuated by the governor P, through the medium of the friction-wheel U, screw and worm-wheel $c^x$ V, and screw-shaft $d^x$, and nut $d^{xx}$. The cylinder $B^x$ may be rotated by gears $a^{xx}$ from the spindle B, and one or more of said feeding devices may be employed, as occasion requires. The motion of the governor P may be regulated as desired by adjusting the slide $p$ on the shaft G. The spring $t$ serves to sustain the friction-wheel U and keep it free from the lower wheel, I', of the sleeve H when the weights $o$ $o$ of the governor P are at their lowest point.

From the above description it will be seen that by a perfectly automatic arrangement the grain may be fed uniformly between the stones and the space between the latter kept at a uniform width, so that the grain will be ground of a uniform degree of fineness. The two governors work in harmony and cannot interfere one with the other, the friction-wheel U being rather smaller in diameter than the friction-wheel L, in order that the latter may be actuated by the wheels I I' without coming in contact with wheel U, the contact of the latter with the wheels I I' being due principally to the action of the shaft T. Instead, however, of having the wheels L U of different diameters, the shafts J T may be adjusted longitudinally by set-screws to bring said wheels nearer to or farther from the wheels I I.

A governor constructed on the same principle as those herein described may be used for actuating the valve in the induction-pipe of a steam-engine or the gate of a water-wheel.

In starting the mill, the attendant or miller adjusts the rotating stone or runner by turning the nut F of the screw-rod E, so that the grain will be ground to the degree of fineness desired, and the uniform fineness is preserved by the governor A' actuating the supplemental bridge-tree C, as described.

Having thus described my invention, what I claim as new, and desire to secure by Letters Patent, is—

1. The governors A' P, provided with slides $e$ $p$, arranged, as shown, for the purpose of regulating their action, in combination with the sliding sleeve H, with the wheels I I' attached, and the friction-wheels L U, or equivalent gearing, for the purpose of regulating the space between the millstones, and also for regulating the feeding of the grain to the same, as herein described, either governor, with its concomitant parts, being used separately or both combined.

2. The fluted cylinder B×  and sliding tube A×, placed in the hopper C×, in connection with the lever W, or its equivalent, operated from the governor P, substantially as shown, for the purpose of feeding the grain to or between the stones, as set forth.

3. The combination of the friction-wheel L with the sliding pinion N, arranged, respectively, with springs M $i$, and provided with inclined surfaces $j$ $k$, to operate in connection with the wheels I I′ on the sleeve H, as and for the purpose set forth.

A. B. HAMAKER.

Witnesses:
 JACOB UHRICH,
 J. R. HOFFER.